May 6, 1924.

W. H. BARLING

MONOCOQUE FUSELAGE

Filed Feb. 17, 1921      2 Sheets—Sheet 1

1,493,094

Inventor
Walter H. Barling
By Robert H. Johns

May 6, 1924.
W. H. BARLING
MONOCOQUE FUSELAGE
Filed Feb. 17, 1921
1,493,094
2 Sheets-Sheet 2
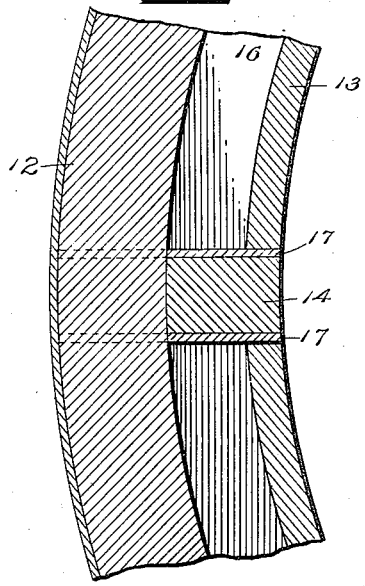
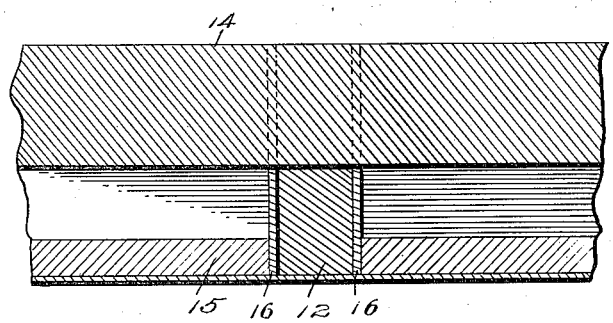
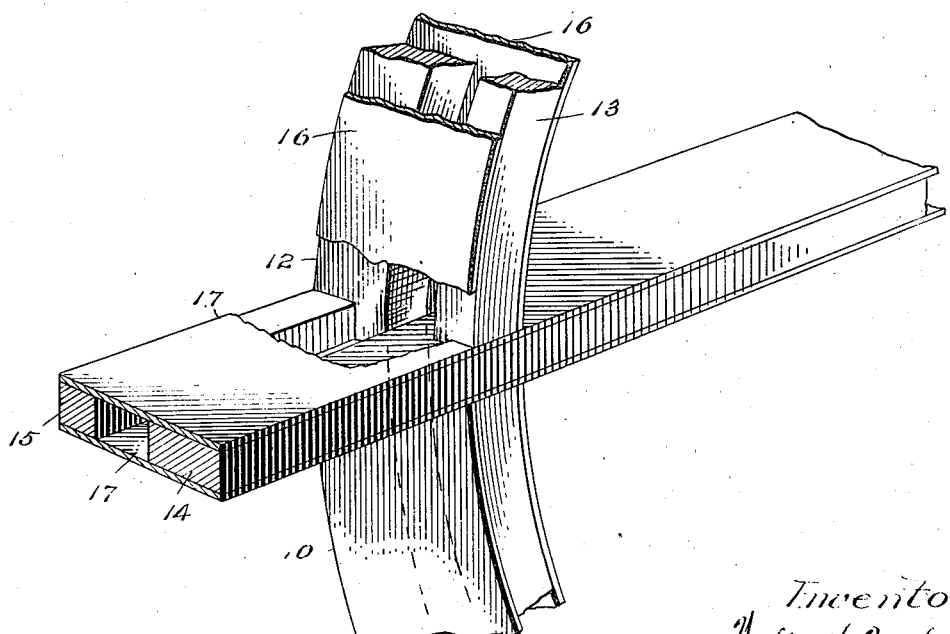

Patented May 6, 1924.

1,493,094

UNITED STATES PATENT OFFICE.

WALTER HENRY BARLING, OF HASBROUCK HEIGHTS, NEW JERSEY.

MONOCOQUE FUSELAGE.

Application filed February 17, 1921. Serial No. 445,843.

*To all whom it may concern:*

Be it known that I, WALTER HENRY BARLING, a citizen of England, residing at Hasbrouck Heights, in the county of Bergen and State of New Jersey, have invented certain new and useful Improvements in Monocoque Fuselages, of which the following is a specification.

This invention relates to aircraft framework construction and while the invention will be described hereinafter as particularly applicable to the construction of a braced monocoque fuselage it will be apparent that the structural details hereinafter particularly described may well be applied to various parts of the construction of aircraft.

In the ordinary construction of a braced monocoque fuselage, the transverse members or hoops are thicker in a radial direction than the longitudinal members, or, as they are termed, longérons. This not only results in taking up useful space within the fuselage but it results in internal projecting rings or flanges which extend radially into the fuselage beyond the inner faces of the longérons and render it difficult and in many cases impracticable to introduce flooring for use as walking ways and for supporting tanks, reservoirs, and the like.

The object of the invention herein fully described and shown is to so construct and join the frame members of an aircraft body that the outer faces of the transverse members or hoops and the longérons are flush and likewise the inner faces of such transverse members or hoops and the longérons are flush. In other words the thickness of the transverse members or hoops in a radial direction is the same as the thickness of the longérons in the same direction.

With the above and other objects in view the invention consists in the novel construction, combination and arrangement herein described, illustrated and claimed.

In the accompanying drawings:

Fig. 4 is a section on the line *b—b* of Fig. 2;

Fig. 5 is a section on the line *c—c* of Fig. 2;

Fig. 6 is an enlarged perspective view showing the relationship or joint between a longéron and a transverse member or hoop.

Figure 1:
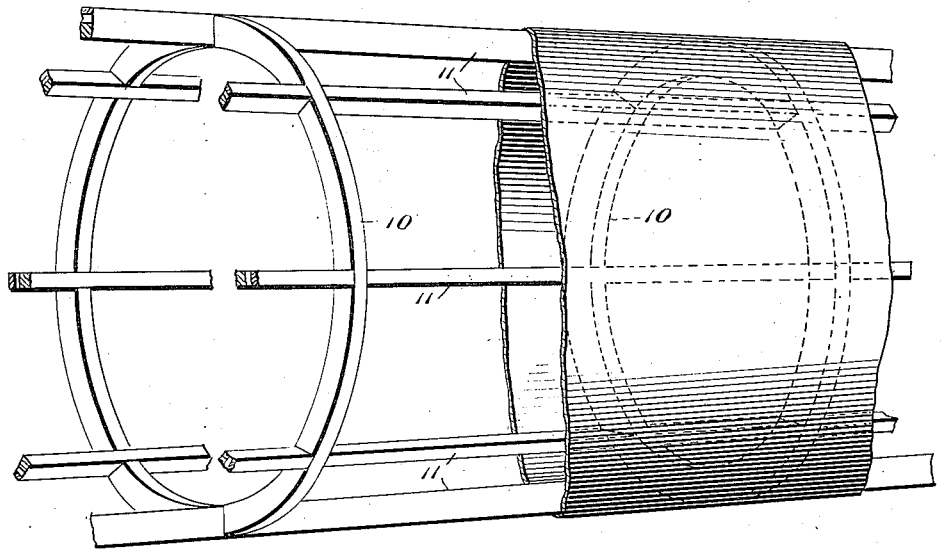
Fig. 1 is a fragmentary perspective view of a braced monocoque fuselage framework embodying the present invention.
Figure 2:
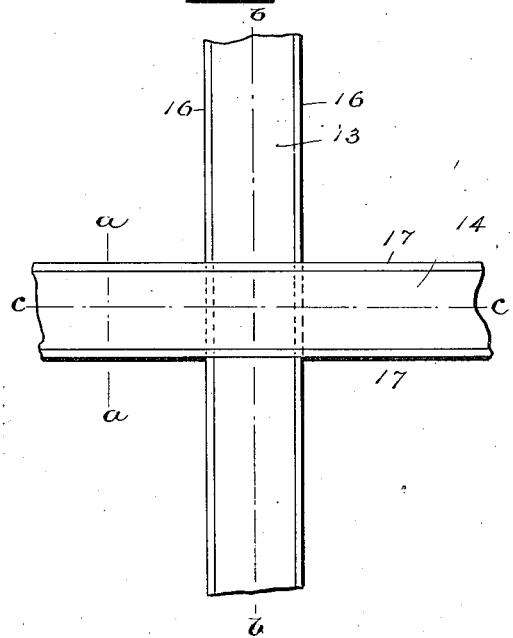
Fig. 2 is a fragmentary face view of the same showing the intersection of a longéron and a hoop or transverse member.
Figure 3:
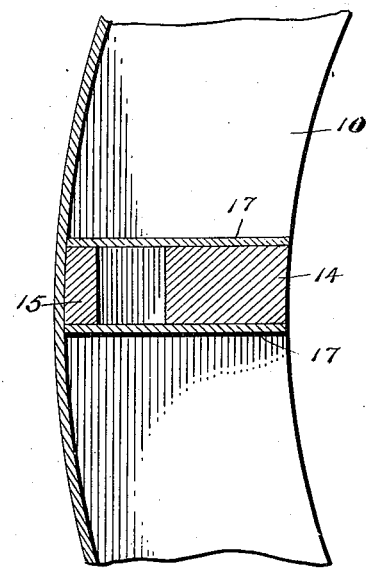
Fig. 3 is a section on the line *a—a* of Fig. 2.

The invention will be described as applied to a braced monocoque fuselage. Referring primarily to Fig. 1, the framework of the fuselage is composed of a plurality of transverse members or hoops 10 and a series of longitudinal members or longérons 11, the said transverse and longitudinal members being jointed rigidly together to form the main framework of the fuselage; it being understood that the fuselage is designed to be covered or enclosed by a skin, sheathing or covering of any suitable material such as wood, veneer, plywood, fibre board, smooth or corrugated sheet metal, or fabric of any kind.

In carrying out the present invention, each hoop or transverse member 10 is made up of a plurality of striplike sections 12 and 13. While I have shown only two of such strip-like sections, it is to be understood that more than two of such sections may be employed in accordance with the size and dimension of the fuselage, the strength required, and other conditions. One of the sections, as for example the section 12, is made considerably larger or thicker than the other section 13 and in such case the section 12 is made continuous, unbroken and uninterrupted thruout its length. Thus, the strength of the section 12 is unimpaired. The sections 12 and 13 are ordinarily made of wood, straight grained to prevent splitting and may be bent into shape by any desired method.

In like manner each of the longérons or longitudinal members is composed of a plurality of strip-like sections 14 and 15, the section 14 being thicker than the section 15 and being continuous, unbroken or uninterrupted thruout its length. Thus the strength of the section 14 is unimpaired. It is usual also to make the sections 14 and 15 of straight or edge grained lumber. Sections 12 and 13 are usually made up laminations, the scarf joints of which are spaced apart around the hoop. They may, however, be made of metal of hollow form and also similarly the other members.

It will be observed that the sections 12 and 13 are arranged in spaced relation to each other, as are also the sections 14 and 15. As best illustrated in Figs. 4 and 5, the main longéron section 14 abuts at one edge against the adjacent edge or face of the main hoop section 12. The other longéron section 15 is divided into lengths or smaller sections which terminally abut and rest against and in contact with the main hoop section 12.

In like manner, the smaller hoop section 13 is divided into smaller sections which terminally abut against the main longéron section 14, or more accurately speaking, against the plate-like members, hereinafter referred to, which serve to tie the longéron sections 14 and 15 together.

Secured fixedly by any approved method or means to opposite sides of the hoop sections 12 and 13 are plate-like members 16 which may consist of plywood, veneer, or other tough material of light weight. Said plate-like members 16 are firmly supported by the main hoop section 12 and act to rigidly tie the sections 13 to the main section 12 thereby reinforcing and greatly strengthening the hoop members as a whole.

In like manner, plate-like members 17 are fixedly secured by any suitable means to opposite sides of the longéron sections 14 and 15 and said members 17 serve to firmly tie the smaller longéron sections 15 to the main longéron section 14.

In the completed structure, as hereinabove described and illustrated in the drawings, the outer faces of the longérons and hoops lie flush with each other as do also the inner edges or faces of said members. This enables the outer skin or covering to be evenly and uniformly applied to and around the framework of the fuselage and it also enables a walking way or floor, tanks, reservoirs, and the like to be firmly secured in place within the fuselage framework and effectively and uniformly supported in place.

While it is at present contemplated to use straight grained lumber in the formation of the sections of the longérons and hoops and to use veneer or plywood in tying said members together as above explained, it is to be understood that other materials may be employed in lieu of the materials named without departing from the principle of the invention described.

Furthermore any means may be employed for fastening the plate-like members 16 and 17 to the strip-like sections of the hoops and longérons. It will also be obvious that the construction herein particularly described may be resorted to in other places in the structure of aircraft in general, the improvements not necessarily being confined to fuselage structure.

I claim:

1. In a hollow body, a frame work embodying longéron members and transverse members which intersect and cross each other, each of said members comprising a plurality of strips, one of said strips of each member being continuous and unbroken at each crossing joint, the strips being so arranged that the inner faces of the frame-forming members lie flush with each other.

2. In a hollow body, a frame work embodying longéron members and transverse members which intersect and cross each other, each of said members comprising a plurality of strips, one of said strips of each member being continuous and unbroken at each crossing joint and one of the strips of each member being interrupted at each crossing joint, the strips being so arranged that the outer faces of the frame forming members lie flush with each other.

3. In a hollow body, a frame work embodying longéron members and transverse members which intersect and cross each other, each of said members comprising a plurality of strips, one of said strips of each member being continuous and unbroken at each crossing joint, the strips being so arranged that the inner faces of the frame-forming members lie flush with each other, and connecting means serving to tie the strips of each frame-forming member together.

4. In a hollow fuselage, a frame work embodying longéron members and transverse members which intersect and cross each other, each of said members comprising a plurality of strips of rectangular cross section, one of said strips of each member being broken at each crossing joint, the strips being so arranged that the outer faces of the frame forming members lie flush with each other, and connecting means serving to tie the strips of each frame-forming member together to thereby form hollow box beams.

5. In a hollow fuselage, a frame work embodying longéron members and transverse members which intersect and cross each other, each of said members comprising a plurality of strips, one of said strips of each member being continuous and unbroken at each cross joint, and the other of said strips of each member being interrupted at each cross joint so that the outer and the inner faces of the frame forming members lie flush with each other and plate-like members serving to tie the strips of each frame-forming member together.

6. In a braced monocoque fuselage, a frame work embodying longéron members and transverse hoop members which intersect and cross each other, each of said members comprising a plurality of strips of different cross section area, the larger of said strips of each member being continuous and unbroken at each cross joint, and means serving to tie the strips of each frame-forming member together, the outer faces of the outer strips of the frame-forming members being flush with each other, and the inner faces of the inner strips of the frame-forming members being flush with each other.

7. A hollow fuselage comprising a framework embodying longitudinal strip members of constant cross section and an uninterrupted transverse hoop member of cross section contacting therewith and outside of the same, longitudinally extending sections serving to space said hoop members and connected to said longitudinal strip members so that the outer faces of the transverse hoop members and of the section are flush with each other, transverse arcuate sections spacing said longitudinal strip members and having an inner surface flush with the inner surface of the longitudinal strip members, and an outer covering connected to said framework.

8. A hollow fuselage comprising a framework embodying longitudinal strip members of constant cross section and transverse hoop members of constant cross section contacting therewith and outside of the same, longitudinally extending sections serving to space said hoop members and connected to said longitudinal strip members so that the outer faces of the transverse hoop members and of the sections are flush with each other, transverse arcuate sections spacing said longitudinal strip members and having an inner surface flush with the inner surface of the longitudinal strip members, said longitudinally extending sections being spaced from and of smaller cross sectional area than the longitudinal strip members, and said arcuate sections being spaced from and of smaller cross sectional area than the transverse hoop members, and an outer covering connected to said framework.

In testimony whereof I have affixed my signature.

WALTER HENRY BARLING.